(12) United States Patent
Noguchi et al.

(10) Patent No.: US 8,150,366 B2
(45) Date of Patent: Apr. 3, 2012

(54) MOBILE TERMINAL AND MOBILE COMMUNICATION SYSTEM

(75) Inventors: Katsuhiro Noguchi, Yokohama (JP); Tsuyoshi Takakura, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 341 days.

(21) Appl. No.: 12/299,402

(22) PCT Filed: May 1, 2007

(86) PCT No.: PCT/JP2007/059314
§ 371 (c)(1), (2), (4) Date: Mar. 18, 2009

(87) PCT Pub. No.: WO2007/126100
PCT Pub. Date: Nov. 8, 2007

(65) Prior Publication Data
US 2009/0270066 A1    Oct. 29, 2009

(30) Foreign Application Priority Data
May 2, 2006 (JP) ................................ 2006-128714

(51) Int. Cl.
H04W 4/02 (2009.01)
H04W 8/12 (2009.01)
H04W 4/22 (2009.01)
H04M 11/04 (2006.01)

(52) U.S. Cl. ............... 455/404.2; 455/404.1; 455/414.2; 455/440; 455/456.1

(58) Field of Classification Search .... 455/404.1–404.2, 455/521, 414.1–414.4, 433, 440–442, 456.1–457
See application file for complete search history.

(56) References Cited

U.S. PATENT DOCUMENTS

2004/0121755 A1* 6/2004 Hurtta ...................... 455/404.1
2004/0137873 A1* 7/2004 Kauppinen et al. ........ 455/404.1
(Continued)

FOREIGN PATENT DOCUMENTS
JP    2009-534967 T    9/2009
(Continued)

OTHER PUBLICATIONS

Siemens AG, Optimized IMS emergency registration procedure, S2-061302, May 1, 2006, 7.2 IMS Registration for Emergency Session, https://www.3gpp.org/ftp/tsg_sa/WG2_Arch/TSGS2_52_Shanghai/Docs/S2-061302.zip); https://www.3gpp.org/ftp/tsg_sa/WG2_Arch/TSGS2_52_Shanghai/Docs, 4 pages.

(Continued)

*Primary Examiner* — Ajit Patel
*Assistant Examiner* — Erica Navar
(74) *Attorney, Agent, or Firm* — Osha Liang LLP

(57) ABSTRACT

A mobile terminal UE according to the present invention performs, in an IP network, a normal communication between the mobile terminal and a normal communication terminal via a first call control apparatus S-CSCF#1, and an emergency-communication between the mobile terminal and an emergency-communication terminal via a second call control apparatus S-CSCF#2, including an emergency-communication session establishment processing unit 14 configured to perform an emergency-communication session establishment process between the mobile terminal UE and the emergency-communication terminal, without performing an emergency-communication location registration process for the mobile terminal in the second call control apparatus S-CSCF#2, when a normal-communication location registration process for the mobile terminal is completed in the first call control apparatus S-CSCF#1.

7 Claims, 16 Drawing Sheets

U.S. PATENT DOCUMENTS

2007/0060097 A1* 3/2007 Edge et al. .................. 455/404.1
2009/0098851 A1 4/2009 Liebhart

FOREIGN PATENT DOCUMENTS

| WO | WO 03094563 A1 | * | 11/2003 |
| WO | WO 2005039227 A1 | * | 4/2005 |
| WO | WO 2006078202 A1 | * | 7/2006 |
| WO | 2007125024 A1 | | 11/2007 |

OTHER PUBLICATIONS

3rd Generation Partnership Project; Technical Specification Group Services and System Aspects; IP Multimedia Subsystem (IMS) emergency sessions (Release 7), 3GPP TS 23.167, V7.0.0, Mar. 2006, 4.1 Architectural Principles, 7.1.1 UE Detectable Emergency Session, 7.2 IMS Registration for Emergency Session (http://www.3gpp.org/ftp/Specs/archive/23_series/23.167/23167-700.zip), 28 pages.

3GPP technical document S2-061940 "Requirement of emergency session establishment without emergency registration," May 8-12, 2006, 6 pages.

3GPP technical document S2-063969 "Emergency IMS registration," Oct. 23-27, 2006, 9 pages.

3GPP technical document R2-07407 "Grouping of logical channels to priority queues," Jan. 15-19, 2007, 2 pages.

International Search Report issued in PCT/JP2007/059314, mailed on Jun. 5, 2007, with translation, 4 pages.

Written Opinion issued in PCT/JP2007/059314, mailed on Jun. 5, 2007 (no translation), 3 pages.

Korean Office Action for Application No. 10-2008-7027787, mailed on Aug. 24, 2010 (5 pages).

3GPP SA WG2 technical document, "Correction to the criteria of IMS emergency registration," Jan. 15-19, 2007, 5 pages.

Japanese Office Action for Application No. 2008-513318, mailed on Jan. 18, 2011 (5 pages).

Chinese Office Action for Application No. 200780016074.2, mailed on Dec. 21, 2010 (9 pages).

* cited by examiner

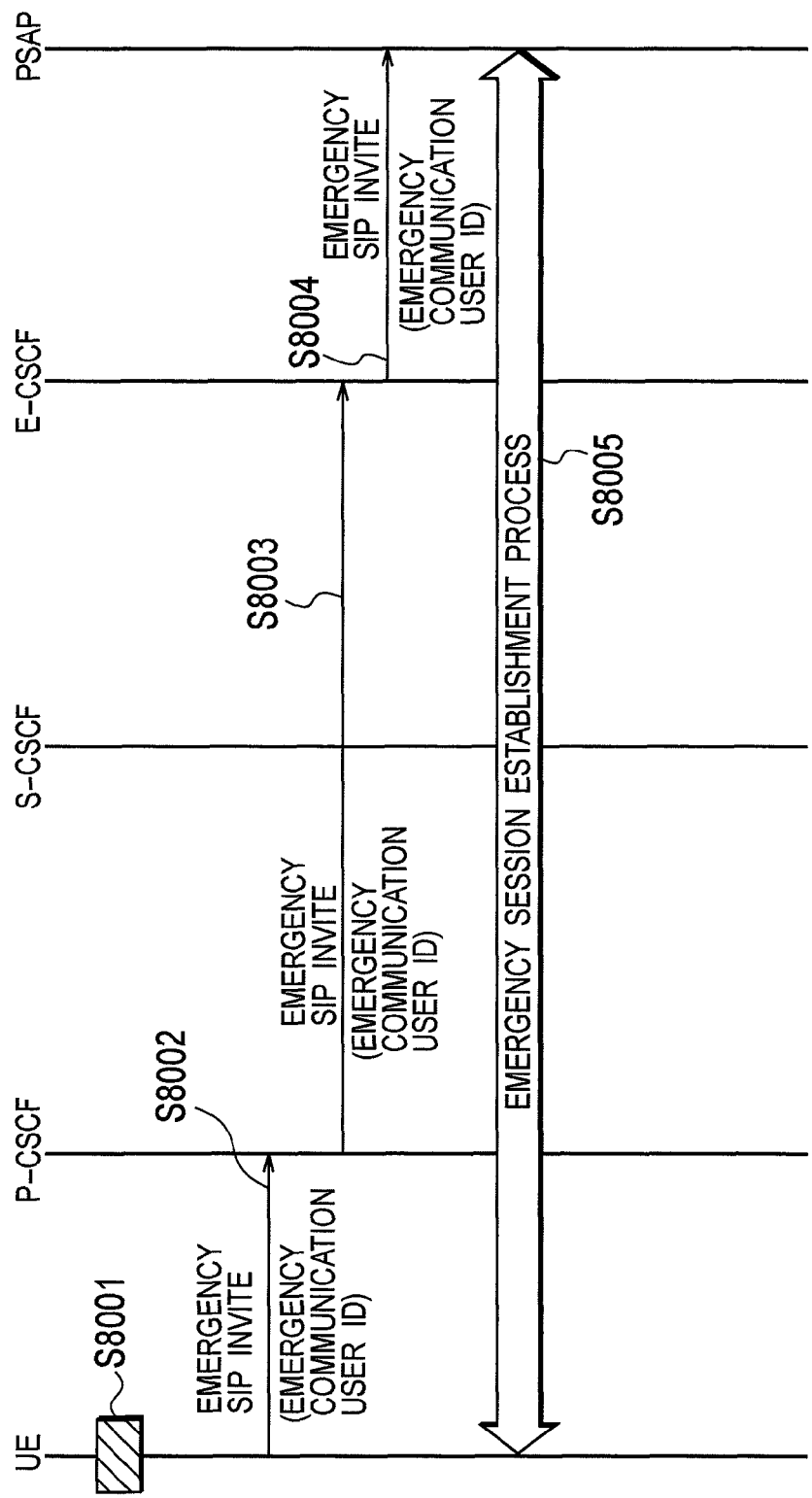

MOBILE TERMINAL AND MOBILE COMMUNICATION SYSTEM

TECHNICAL FIELD

The present invention relates to a mobile terminal and a mobile communication system, in which normal communications are performed between the mobile terminal and a normal communication terminal via a first call control apparatus and emergency-communications are performed between the mobile terminal and an emergency-communication terminal via a second call control apparatus, in an IP network including the first and second call control apparatus.

BACKGROUND ART

The 3rd Generation Partnership Project (3GPP), which is an international standardization organization for the third generation mobile communication system, has proposed a mobile communication system capable of performing emergency-communications between a mobile terminal and an emergency-communication terminal via an IP network (see Non-patent Document 1).

As shown in FIG. 1, such mobile communication system includes an IP network configured of an IMS (IP Multimedia Subsystem) and an IP-CAN (GPRS/I-WLAN).

Here, the IP-CAN is an acronym standing for "IP-Connectivity Access Network," GPRS is an acronym for "General Packet Radio Service," and I-WLAN is an acronym standing for "Interworking Wireless Access Network."

In addition, the IMS is provided with a P-CSCF (Proxy-Call Sever Control Function), an S-CSCF (Serving-Call Server Control Function), an E-CSCF (Emergency-Call Server Control Function), and an HSS (Home Subscriber Server), while the IP-CAN (GPRS/I-WLAN) is provided with a function allowing the forwarding of IP data (SIP signals or VoIP packets).

Here, the S-CSCF, the E-CSCF and the P-CSCF are SIP (Session Initiation Protocol) servers (call control apparatus) for controlling a normal-communication session between a mobile terminal UE and a normal communication terminal or an emergency-communication session between the mobile terminal UE and an emergency-communication terminal (PSAP: Public Safety Answering Point).

Note that, the mobile terminal UE is configured to perform normal communications between the mobile terminal UE and a normal communication terminal (not shown in the drawings) via an S-CSCF#1 (first call control apparatus) and emergency-communications between the mobile terminal UE and the emergency-communication terminal PSAP, via an S-CSCF#2 (second call control apparatus) and an E-CSCF.

By referring to FIG. 2, operations to start emergency-communications between the mobile terminal UE and PSAP in the above-described mobile communication system will be described.

As shown in FIG. 2, in step S7001, the mobile terminal UE transmits, to the P-CSCF, an "Normal Registration Request" for requesting that the S-CSCF#1 perform a normal-communication location registration process (Normal Registration process) for the mobile terminal UE, by using normal-communication user identifiers (IMPI: an IP Multimedia Private Identifier and a Normal IMPU: IP Multimedia Public Identity).

In step S7002, in response to the "Normal Registration Request," the normal-communication location registration process for the mobile terminal UE is performed between the mobile terminal UE and the S-CSCF#1 by referring to the HSS.

Thereafter, in step S7003, the mobile terminal UE transmits, to the P-CSCF, an "Emergency Registration Request" for requesting that the S-CSCF#2 perform an emergency-communication location registration process (Emergency Registration process) for the mobile terminal UE, by using an emergency-communication user identifier (Emergency IMPU).

In step S7004, in response to the "Emergency Registration Request," the emergency-communication location registration process for the mobile terminal UE is performed between the mobile terminal UE and the S-CSCF#2 by referring to the HSS.

After the above emergency-communication location registration process is completed, in step S7005, the mobile terminal UE transmits, to the P-CSCF, an "Emergency SIP Invite" for requesting that an emergency-communication session establishment process be performed between the mobile terminal UE and the PSAP, by using the emergency-communication user identifier.

In step S7006, the P-CSCF forwards the received "Emergency SIP Invite" to the E-CSCF.

In step S7007, in response to the "Emergency SIP Invite," the emergency-communication session establishment process (Emergency Session Establishment process) is performed between the mobile terminal UE and the PSAP.

The mobile terminal UE can perform emergency-communications between the mobile terminal UE and the PSAP by using the emergency-communication session establishment process set as described above.

However, in the above-described mobile communication system, in order to allow emergency-communications from a mobile terminal in which a UICC is not provided (mobile terminal UE of a non-subscribed user), an emergency-communication location registration process, which is required only for performing emergency-communications, has to be performed, in addition to the normal-communication location registration process.

In addition, the above-described mobile communication system requires to perform both of the normal-communication location registration process and the emergency-communication location registration process, since a normal-communication call control apparatus (S-CSCF#1) is different from an emergency-communication call control apparatus (S-CSCF#2) provided to a command station of, for example, police, fire, Japan Coast Guard services or the like.

Examples of the aforementioned example in which a normal-communication call control apparatus (S-CSCF#1) is different from an emergency-communication call control apparatus (S-CSCF#2) includes an example in which a mobile terminal UE performs an emergency-communication session establishment process from a network outside its home network.

Accordingly, in the above-described communication system, even when a normal-communication location registration process for a certain mobile terminal UE is completed, an emergency-communication registration process for the mobile terminal UE has to be additionally performed. Thus, the communication system has a problem that time until starting emergency-communications is longer.

Non-patent Document 1: 3GPP TS23.167 Ver.7.0.0

DISCLOSURE OF THE INVENTION

The present invention has been made in view of the foregoing problem. Accordingly, an object of the present invention is to provide a mobile terminal and a mobile communication system, which can shorten a time until starting an emergency-communication in an IP network.

A first aspect of the invention is summarized as a mobile terminal that performs a normal communication between the mobile terminal and a normal communication terminal via a first call control apparatus, and an emergency-communication between the mobile terminal and an emergency-communication terminal via a second call control apparatus, in an IP network including the first call control apparatus and the second call control apparatus. The mobile terminal includes: an emergency-communication session establishment processing unit configured to perform an emergency-communication session establishment process between the mobile terminal and the emergency-communication terminal, without performing an emergency-communication location registration process for the mobile terminal in the second call control apparatus, when a normal-communication location registration process for the mobile terminal is completed in the first call control apparatus.

In the first aspect of the invention, the emergency-communication session establishment processing unit may be configured to perform the emergency-communication session establishment process between the mobile terminal and the emergency-communication terminal, without performing the emergency-communication location registration process for the mobile terminal in the second call control apparatus, when the normal-communication location registration process for the mobile terminal is completed in the first call control apparatus and when a determination is made that not both of the normal-communication location registration process for the mobile terminal and the emergency-communication location registration process for the mobile terminal need to be performed in performing the emergency communication in the IP network.

In the first aspect of the invention, the emergency-communication session establishment processing unit may be configured to make the determination based on information notified from the IP network in performing the normal-communication location registration process for the mobile terminal.

The first aspect of the invention may be configured to further include an emergency-communication location registration processing unit configured to transmit an emergency-communication location registration request for requesting that the second call control apparatus perform the emergency-communication location registration process for the mobile terminal, when the normal-communication location registration process for the mobile terminal is not completed in the first call control apparatus, and the emergency-communication session establishment processing unit may be configured to perform the emergency-communication session establishment process between the mobile terminal and the emergency-communication terminal, without performing the normal-communication location registration process for the mobile terminal in the first call control apparatus, when the emergency-communication location registration process for the mobile terminal is completed in the second call control apparatus in response to the emergency-communication location registration request.

The first aspect of the invention may be configured to include an emergency-communication location registration processing unit configured to transmit an emergency-communication location registration request for requesting that the second call control apparatus perform the emergency-communication location registration process for the mobile terminal, when a UICC is not provided in the mobile terminal, and the emergency-communication session establishment processing unit may be configured to perform, the emergency-communication session establishment process between the mobile terminal and the emergency-communication terminal without performing the normal-communication location registration process for the mobile terminal in the first call control apparatus, when the emergency-communication location registration process for the mobile terminal is completed in the second call control apparatus in response to the emergency-communication location registration request.

In the first aspect of the invention, the emergency-communication session establishment processing unit may be configured to make the determination based on information notified from the IP network in performing a location registration process in the IP network.

A second aspect of the invention is summarized as a mobile communication system in which a mobile terminal performs a normal communication between the mobile terminal and a normal communication terminal via a first call control apparatus, and performs an emergency-communication between the mobile terminal and an emergency-communication terminal via a second call control apparatus, the normal communication and the emergency-communication being performed via an IP network including the first call control apparatus and the second call control apparatus. The mobile terminal is configured to transmit an emergency-communication session establishment process request for requesting that an emergency-communication session establishment process be performed between the mobile terminal and the emergency-communication terminal, when a normal-communication location registration process for the mobile terminal is completed in the first call control apparatus, and the IP network is configured to perform the emergency-communication session establishment process between the mobile terminal and the emergency-communication terminal, when the emergency-communication location registration process for the mobile terminal is not performed in the second call control apparatus and when the normal-communication location registration process for the mobile terminal is completed in the first call control apparatus.

BRIEF DESCRIPTION OF THE DRAWINGS

FIG. 16 is a sequential view for illustrating the operations of the mobile communication system according to the first embodiment of the present invention.

BEST MODES FOR CARRYING OUT THE INVENTION (Configuration of a Mobile Communication System According to a First Embodiment of the Present Invention)

Figure 1:
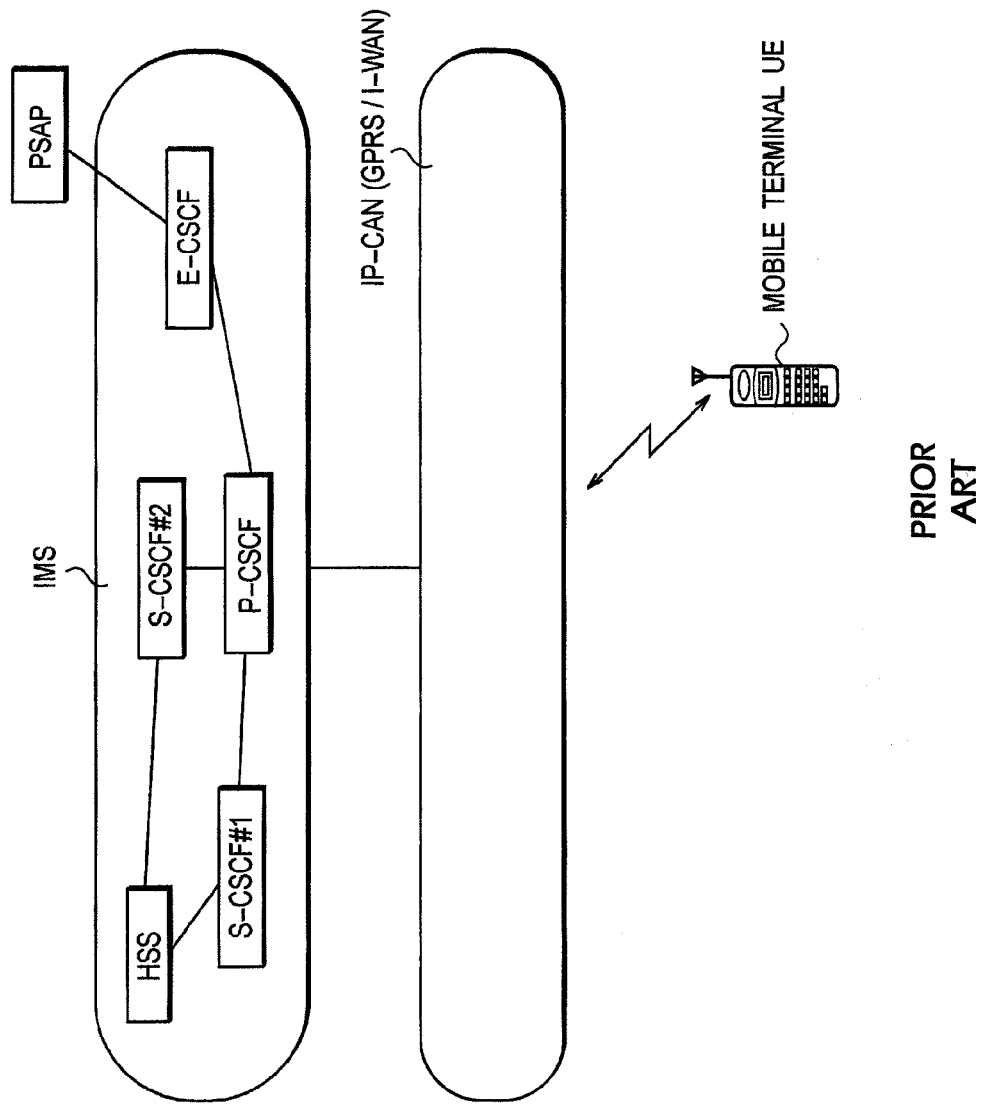
FIG. 1 is an overall configurational view of a general mobile communication system.
Figure 2:
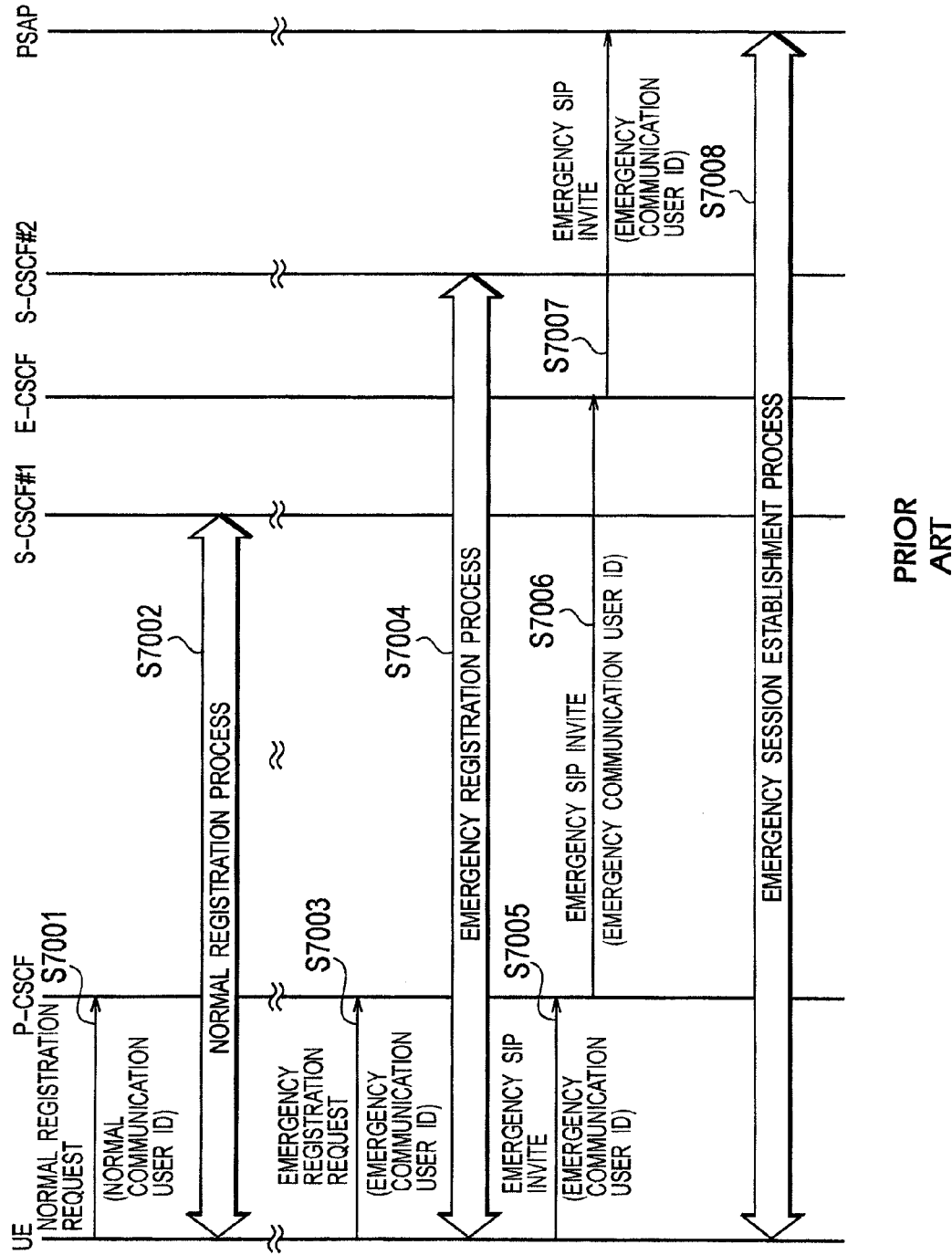
FIG. 2 is a sequential view for illustrating operations of a mobile communication system according to a conventional art.

As shown in FIG. 1, a mobile communication system according to the present embodiment is configured so that a mobile terminal UE perform normal communications between the mobile terminal UE and a normal communication terminal via the S-CSCF#1; and emergency-communications between the mobile terminal UE and a PSAP (emergency-communication terminal) via the S-CSCF#2 and the E-CSCF, in the IP network including an S-CSCF#1 (first call control apparatus), an S-CSCF#2 (second call control apparatus), an E-CSCF, and a P-CSCF.

Here, as will be described later, such IP network is configured so that an emergency-communication session establishment process (Emergency Session Establishment process) between the mobile terminal UE and the PSAP would be performed even when an emergency-communication location registration process (Emergency Registration process) for the mobile terminal UE is not performed in the S-CSCS#2, as long as a normal-communication location registration process (Normal Registration process) for the mobile terminal UE is completed in the S-CSCS#1.

Figure 3:
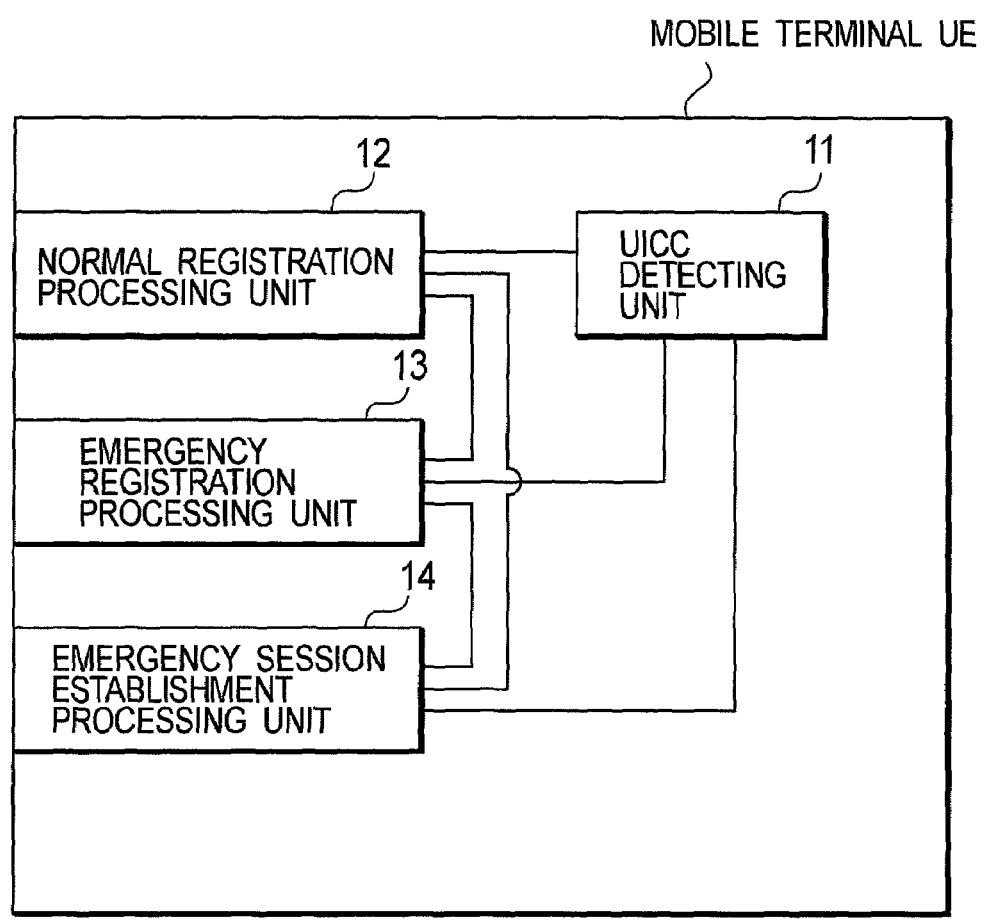
FIG. 3 is a functional block diagram of a mobile terminal according to a first embodiment of the present invention.

Referring to FIG. 3, the configuration of the mobile terminal UE according to the first embodiment of the present invention will be described.

The mobile terminal UE according to the present embodiment is configured so as to perform normal communications between the mobile terminal UE and a normal communication terminal via the S-CSCF#1; and emergency-communications between the mobile terminal UE and the PSAP via the S-CSCF#2 and the E-CSCF in the above-described IP network.

As shown in FIG. 3, the mobile terminal UE according to the present embodiment is provide with a UICC detecting unit 11, a Normal Registration processing unit 12, an Emergency Registration processing unit 13, and an Emergency Session Establishment processing unit 14.

The UICC detecting unit 11 is configured to detect whether a UICC (Universal Integrated Circuit Card) is provided in the mobile terminal UE.

The Normal Registration processing unit 12 is configured to perform a normal-communication location registration process (Normal Registration process) for the mobile terminal UE in the S-CSCF#1 when a predetermined condition, for example, at power-on of the mobile terminal UE is satisfied.

Specifically, in order to perform the normal-communication location registration process, the Normal Registration processing unit 12 is configured to transmit, to the P-CSCF, a normal registration request for requesting that a normal-communication location registration process be performed by using normal-communication user identifiers.

The Emergency Registration processing unit 13 is configured to perform an emergency-communication location registration process (Emergency Registration process) for the mobile terminal UE in the S-CSCF#2 when a predetermined condition is satisfied.

Specifically, the Emergency Registration processing unit 13 is configured to transmit, to the P-CSCF, an emergency registration request for requesting that an emergency-communication location registration process be performed by using emergency-communication user identifiers, in order to perform the emergency-communication location registration process.

For example, when a UICC is not provided in the mobile terminal UE or a normal-communication location registration process for the mobile terminal UE is not completed in the S-CSCF#1, the Emergency Registration processing unit 13 is configured to transmit, to the P-CSCF, an emergency registration request for requesting that the S-CSCF#2 perform emergency-communication location registration process for the mobile terminal UE by using emergency-communication user identifiers.

When the predetermined condition is satisfied, the Emergency Session Establishment processing unit 14 is configured to perform an emergency-communication session establishment process (Emergency Session Establishment process) for performing emergency-communications between the mobile terminal UE and the PSAP via the S-CSCF#2 and the E-CSCF.

Specifically, in order to perform such emergency-communication session establishment process, the Emergency Session Establishment processing unit 14 is configured to transmit an emergency-communication session establishment process request (Emergency SIP Invite) for requesting that an emergency-communication session establishment process be performed between the mobile terminal UE and the PSAP.

For example, the Emergency Session Establishment processing unit 14 is configured to perform an emergency-communication session establishment process between the mobile terminal UE and the PSAP without performing an emergency-communication location registration process for the mobile terminal UE in the S-CSCF#2, when a normal-communication location registration process for the mobile terminal UE is completed in the S-CSCF#1, and when it is determined that not both of the normal-communication for the mobile terminal UE and emergency-communication location registration process for the mobile terminal UE need to be performed in order to perform the emergency-communications in the above-described IP network.

Here, the Emergency Session Establishment processing unit 14 may be configured to make the above-described determination based on information (determination key, for example) notified from the IP network in performing the normal-communication location registration process for the mobile terminal UE.

In addition, the Emergency Session Establishment processing unit 14 is configured to perform an emergency-communication session establishment process between the mobile terminal UE and the PSAP without performing a normal-communication location registration process for the mobile terminal UE in the S-CSCF#1, when an emergency-communication location registration process for the mobile terminal UE is completed in the S-CSCF #1 in response to the above-mentioned emergency registration request.

(Operations of the Mobile Communication System According to the First Embodiment of the Present Invention)

Hereinafter, operations of the mobile communication system according to the present embodiment will be described by referring to FIGS. 4 to 10.

Specifically, the operations of the mobile terminal UE according to the present embodiment will be described by referring to FIGS. 4 to 6 and the operations of the mobile communication system according to the present embodiment will be described by referring to FIGS. 7 to 10.

Figure 4:
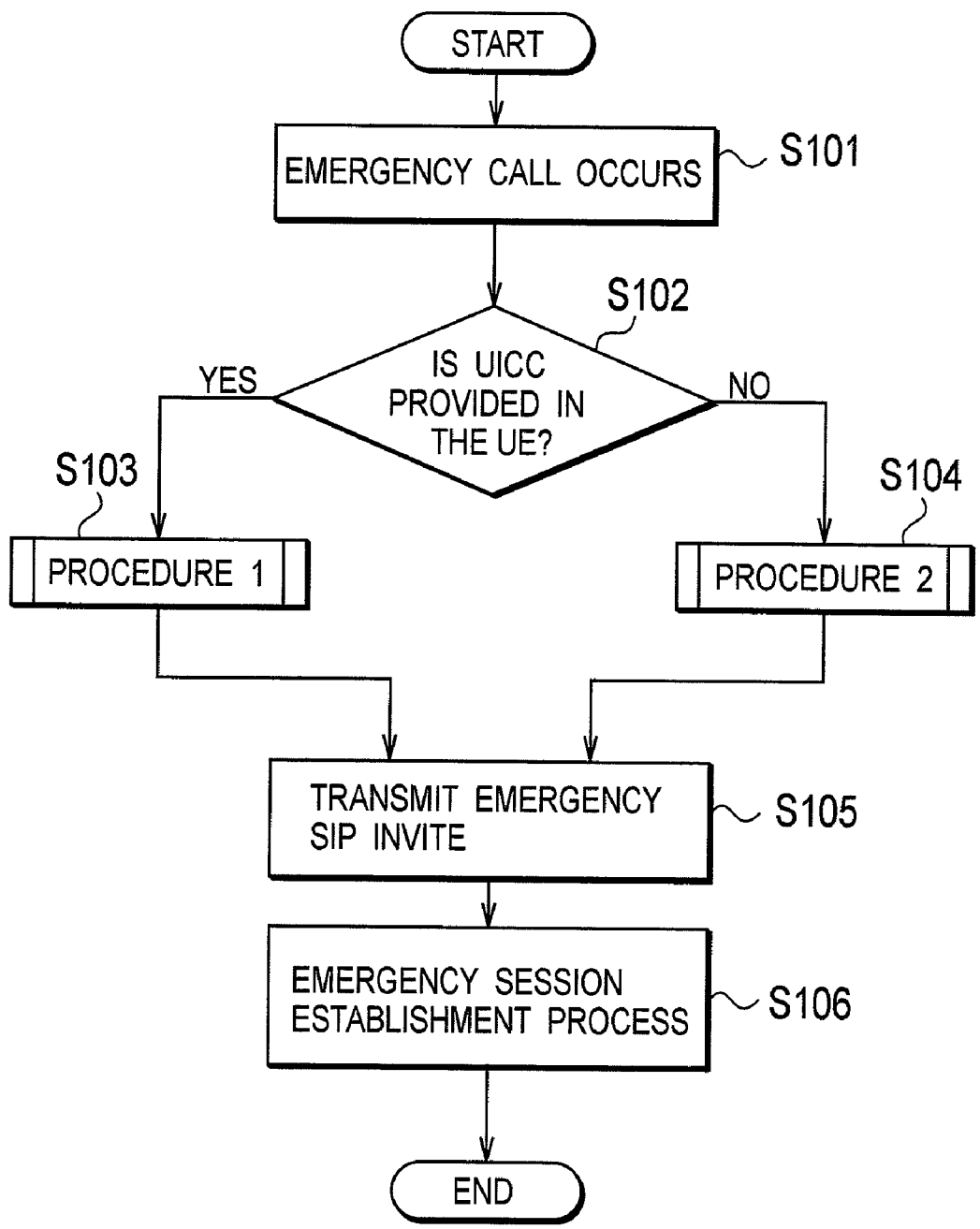
FIG. 4 is a flowchart showing overall operations of a mobile communication system according to the first embodiment of the present invention.

As shown in FIG. 4, in step S101, an emergency call to be transmitted from the mobile terminal UE to the PSAP occurs.

In step S102, the mobile terminal UE determines whether a UICC is provided in the mobile terminal UE.

Figure 5:
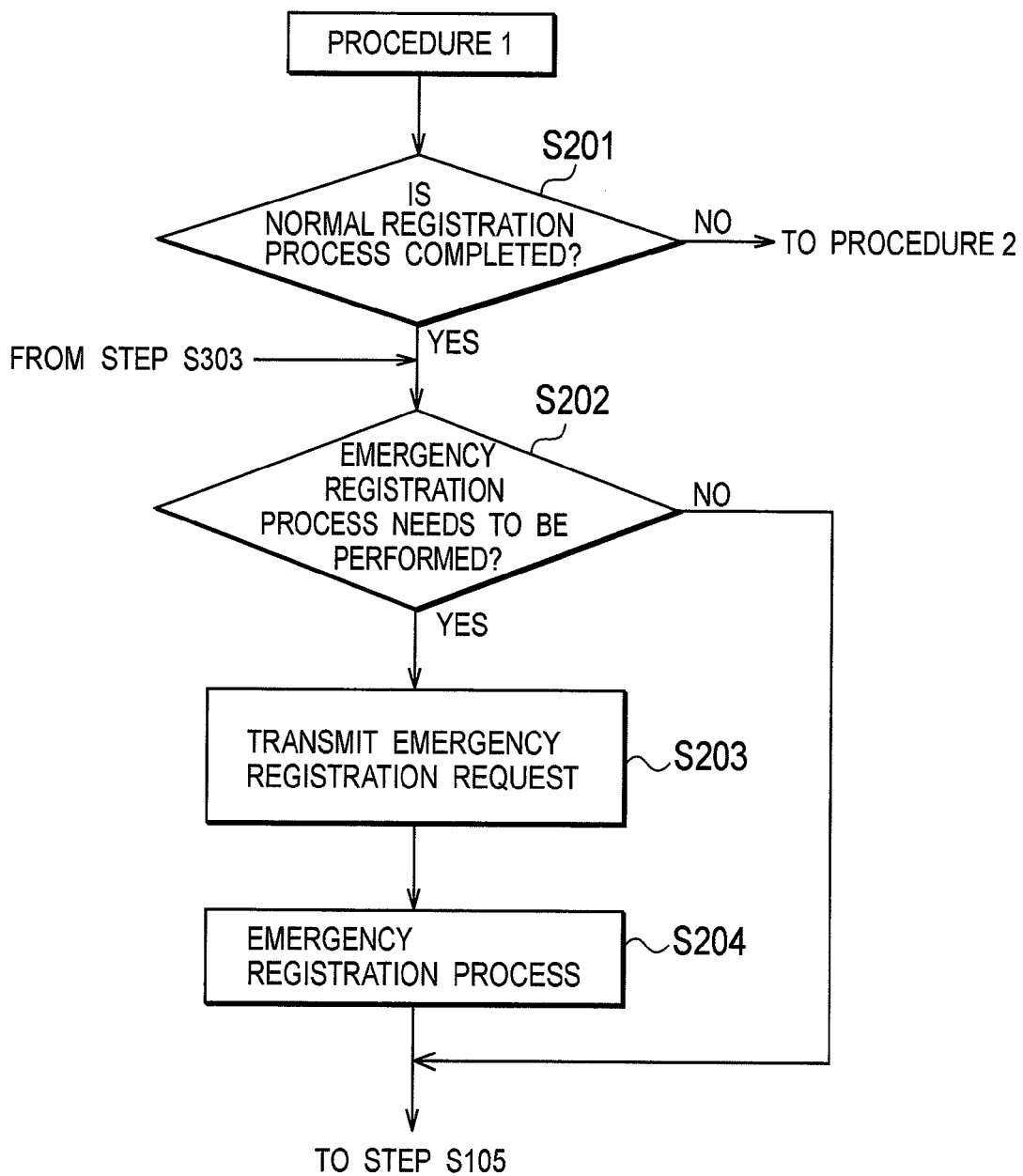
FIG. 5 is a flowchart at a procedure 1 in the overall operations of the mobile communication system according to the first embodiment of the present invention.

When it is determined that a UICC is provided in the mobile terminal UE, the present operation proceeds to step S103 to execute the procedure 1 shown in FIG. 5. When it is determined that a UICC is not provided in the mobile terminal UE, the present operation proceeds to step S104 to execute the procedure 2 shown in FIG. 6.

Firstly, with reference to FIG. 5, operations of the procedure 1 performed by the mobile terminal UE will be described.

As shown in FIG. 5, in step S201, the mobile terminal UE determines whether a normal-communication location registration process for the mobile terminal UE is completed in the S-CSCF#1.

When it is determined that the normal-communication location registration process is completed, the present operation proceeds to step S202. When it is determined that the normal-communication location registration process is not completed, the procedure 2 shown in FIG. 6 is executed in the present operation.

In step S202, the mobile terminal UE determines whether an emergency-communication location registration process for the mobile terminal UE needs to be performed in the S-CSCF#2, based on information (determination key, for example) notified from the IP network in performing the normal-communication location registration process for the mobile terminal UE. In other words, the mobile terminal UE determines whether both of the normal-communication for the mobile terminal UE and the emergency-communication location registration process for the mobile terminal UE need to be performed in order to perform emergency-communications in the IP network.

When it is determined that both of the normal-communication location registration process and the emergency-communication location registration process need to be performed, the present operation proceeds to step S203. When it is determined that not both of the normal-communication location registration process and the emergency-communication location registration process need to be performed, the present operation proceeds to step S105 in FIG. 4.

In step S203, the mobile terminal UE transmits, to the P-CSCF, an emergency registration request for requesting that an emergency-communication location registration process be performed by using emergency-communication user identifiers, in order to perform the emergency-communication location registration process.

In step S204, the mobile terminal UE performs the emergency registration between the mobile terminal UE and the S-CSCF#2. Thereafter, the present operation proceeds to step S105 in FIG. 4.

Secondly, with referring to FIG. 6, operations of the procedure 2 performed by the mobile terminal UE will be described.

Figure 6:
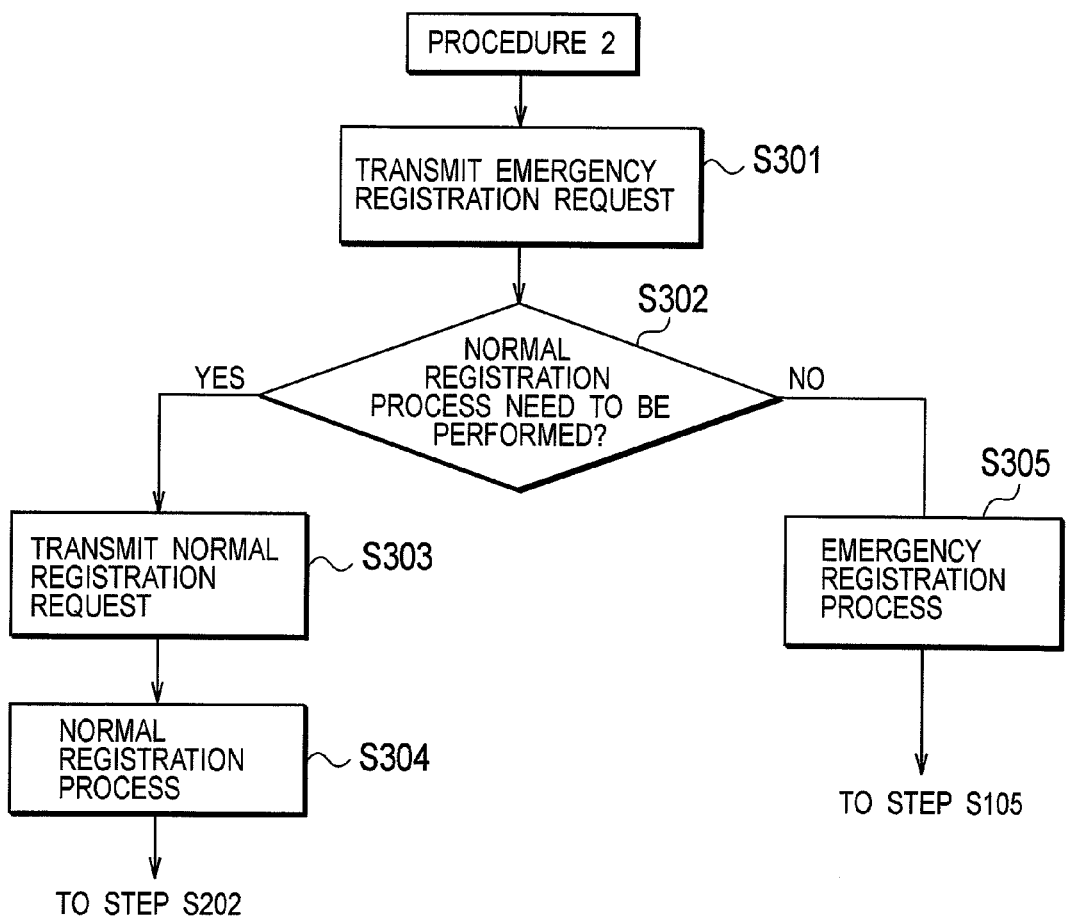
FIG. 6 is a flowchart at a procedure 2 in the overall operations of the mobile communication system according to the first embodiment of the present invention.

As shown in FIG. 6, in step S301, the mobile terminal UE transmits, to the P-CSCF, an emergency registration request for requesting that the S-CSCF#2 perform an emergency-communication location registration process for the mobile terminal UE by using emergency-communication user identifiers.

In step S302, the mobile terminal UE determines whether a normal-communication location registration process for the mobile terminal UE needs to be performed in the S-CSCF#1, based on an instruction included in a response from the P-CSCF for the emergency registration request. In other words, the mobile terminal UE determines whether a normal-communication location registration process for the mobile terminal UE needs to be performed before an emergency-communication location registration process for the mobile terminal UE is performed in the IP network.

When it is determined that the normal-communication location registration process needs to be performed, the present operation proceeds to step S303. When it is determined that the normal-communication location registration process does not need to be performed, the present operation proceeds to step S305.

In step S303, the mobile terminal UE transmits, to the P-CSCF, a normal registration request for requesting that a normal-communication location registration process be performed by using normal-communication user identifiers, in order to perform such normal-communication location registration process.

In step S304, the mobile terminal UE performs a normal-communication location registration process for the mobile terminal UE between the mobile terminal UE and the S-CSCF#1. Thereafter, the present operation proceeds to step S202 in FIG. 5.

Note that, when a UICC is not provided in the mobile terminal UE, the mobile terminal UE cannot perform the normal-communication location registration process by using a normal-communication user identifier and thus cannot perform emergency-communications between the mobile terminal UE and the PSAP.

In step S305, the mobile terminal UE performs an emergency-communication location registration process for the mobile terminal UE between the mobile terminal UE and the S-CSCF#2. Thereafter, the present operation proceeds to step S105 in FIG. 4.

In step S105, the mobile terminal UE transmits, to the P-CSCF, emergency-communication session establishment process request (Emergency SIP Invite) for requesting that an emergency-communication session establishment process be performed between the mobile terminal UE and the PSAP, in order to perform the emergency-communication session establishment process between the mobile terminal UE and the PSAP.

In step S106, the mobile terminal UE performs the emergency-communication session establishment process between the mobile terminal UE and the PSAP, the emergency-communication session establishment process being used for emergency-communications.

Next, operations (in four cases) to start emergency-communications between the mobile terminal UE and a PSAP in the mobile communication system according to the present embodiment will be described by referring to FIGS. 7 to 10.

Firstly, the operations of the mobile communication system according to a first case of the present embodiment will be described by referring to FIG. 7.

Figure 7:
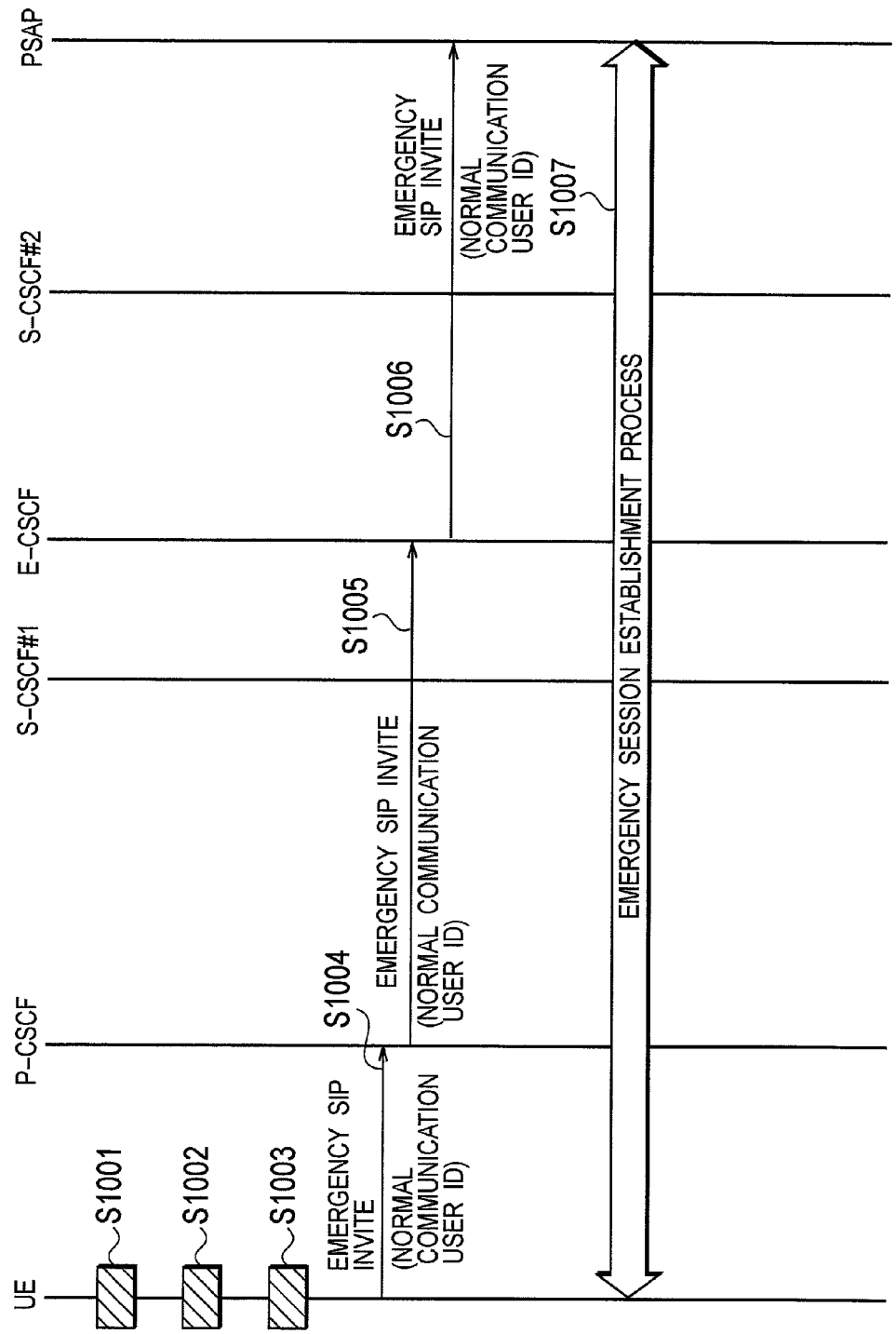
FIG. 7 is a sequential view for illustrating the operations of the mobile communication system according to the first embodiment of the present invention.

In the first case, as shown in FIG. 7, the mobile terminal UE determines: that a UICC is provided in the mobile terminal UE in step S1001; that a normal-communication location registration process for the mobile terminal UE is completed in the S-CSCF#1 in step S1002; and that, in step S2003, not both of the normal-communication location registration process and the emergency-communication location registration process for the mobile terminal UE need to be performed, in performing the emergency-communications in the IP network.

In such case, in step S1004, the mobile terminal UE transmits, to the P-CSCF, an emergency-communication session establishment process request for requesting that an emergency-communication session establishment process (Emergency Session Establishment process) be performed between the mobile terminal UE and the PSAP by using normal-communication user identifiers, without performing an emergency-communication location registration process for the mobile terminal UE in the S-CSCF#2.

In step S1005, the P-CSCF forwards the received emergency-communication session establishment process request to the E-CSCF.

In step S1006, the E-CSCF forwards the received emergency-communication session establishment process request to the PSAP.

In step S1007, an emergency-communication location registration process for the mobile terminal UE is not performed in the S-CSCF#2. Nonetheless, the emergency-communication session establishment process between the mobile terminal UE and the PSAP is performed, since the normal-communication location registration process for the mobile terminal UE is completed in the S-CSCF#1.

By using the emergency-communication session establishment process set as described above, the mobile terminal UE can perform emergency-communications between the mobile terminal UE and the PSAP.

Secondly, the operations of the mobile communication system according to a second case of the present embodiment will be described by referring to FIG. 8.

Figure 8:
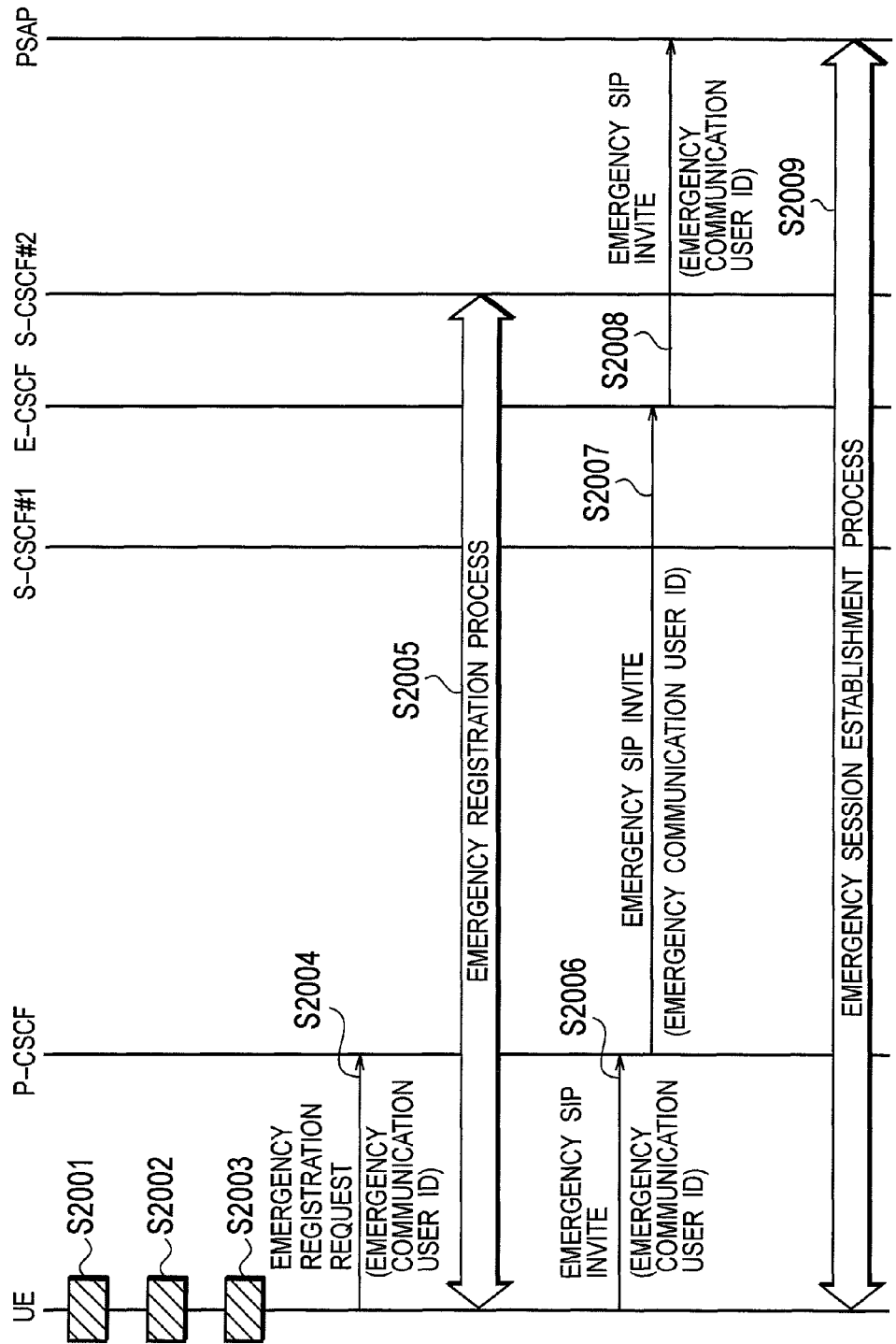
FIG. 8 is a sequential view for illustrating the operations of the mobile communication system according to the first embodiment of the present invention.

In the second case, as shown in FIG. 8, the mobile terminal UE determines: that a UICC is provided in the mobile terminal UE in step S2001; that a normal-communication location registration process for the mobile terminal UE is completed in the S-CSCF in step S2002; and that, in step S2003, both of the normal-communication location registration process and the emergency-communication location registration process for the mobile terminal UE need to be performed in order to perform emergency-communications in the IP network.

In step S2004, the mobile terminal UE transmits, to the P-CSCF, an emergency registration request for requesting that the S-CSCF#2 perform an emergency-communication location registration process for the mobile terminal UE by using emergency-communication user identifiers.

In step S2005, in response to the emergency registration request, an emergency-communication location registration process for the mobile terminal UE is performed between the mobile terminal UE and the S-CSCF#2, by referring to the HSS.

In step S2006, the mobile terminal UE transmits, to the P-CSCF, an emergency-communication session establishment process request (Emergency SIP Invite) for requesting that an emergency-communication session establishment process be performed between the mobile terminal UE and the PSAP by using emergency-communication user identifiers, after the emergency-communication location registration process is completed.

In step S2007, the P-CSCF forwards the received Emergency SIP Invite to the E-CSCF.

In step S2008, the E-CSCF forwards the received Emergency-communication session establishment process request to the PSAP.

In step S2009, in response to the Emergency SIP Invite, the emergency-communication session establishment process between the mobile terminal UE and the PSAP is performed between the mobile terminal UE and the PSAP.

By using the emergency-communication session establishment process set as described above, the mobile terminal UE can perform emergency-communications between the mobile terminal UE and the PSAP.

Thirdly, the operations of the mobile communication system according to a third case of the present embodiment will be described while referring to FIG. 9.

Figure 9:
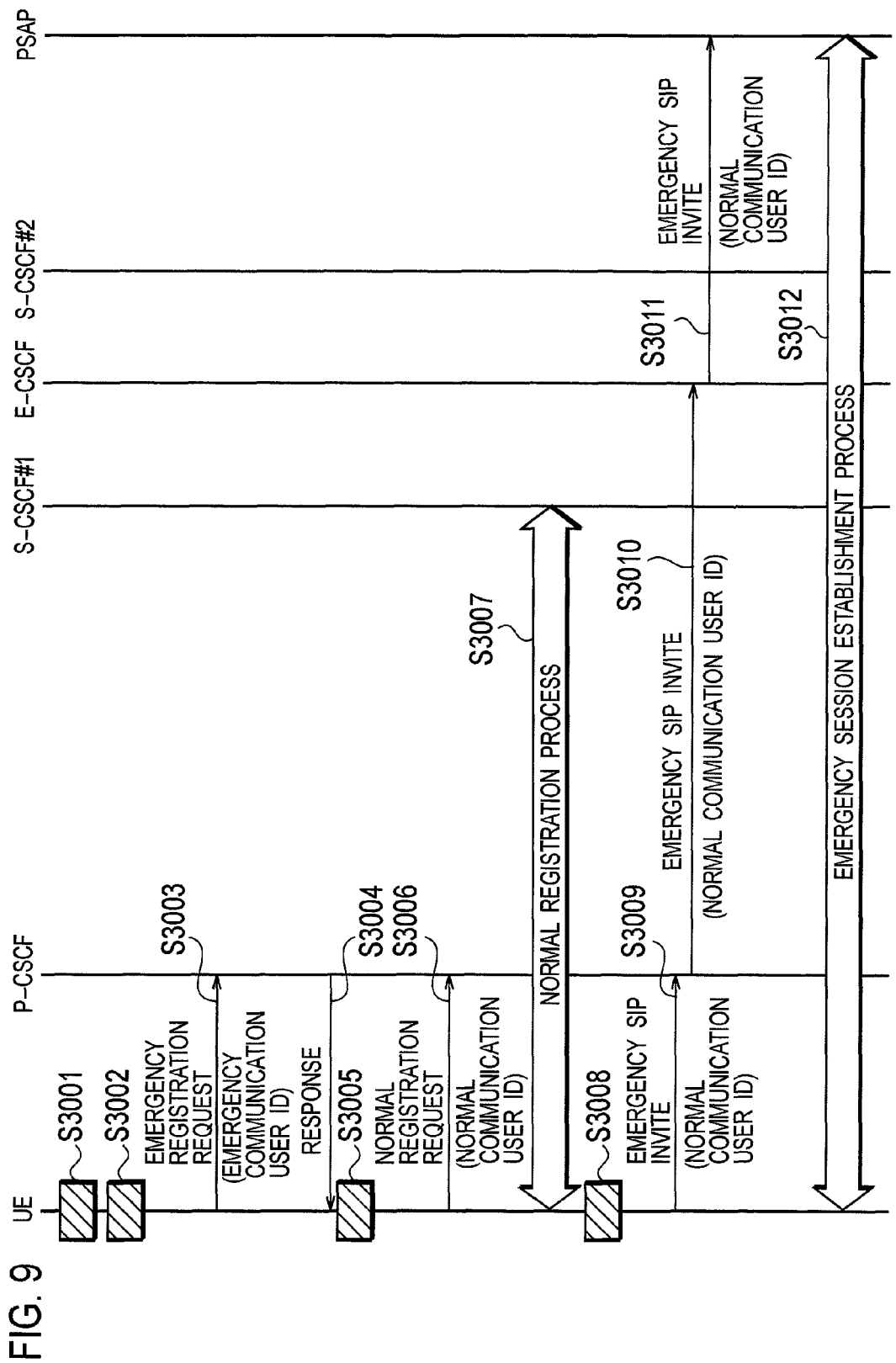
FIG. 9 is a sequential view for illustrating the operations of the mobile communication system according to the first embodiment of the present invention.

In the third case, as shown in FIG. 9, the mobile terminal UE determines: that a UICC is provided in the mobile terminal UE in step S3001; and that a normal-communication location registration process for the mobile terminal UE is not completed in the S-CSCF#1 in step S3002.

In step S3003, the mobile terminal UE transmits, to the P-CSCF, an emergency registration request for requesting that the S-CSCF#2 perform an emergency-communication location registration process for the mobile terminal UE by using emergency-communication user identifiers.

In step S3004, in response to the emergency registration request, the P-CSCF transmits a response including an instruction indicating whether or not a normal-communication location registration process for the mobile terminal UE needs to be performed before performing an emergency-communication location registration process for the mobile terminal UE in the IP network.

In step S3005, the mobile terminal UE determines, based on the response from the P-CSCF, whether or not a normal-communication location registration process for the mobile terminal UE needs to be performed before performing an emergency-communication location registration process for the mobile terminal UE in the IP network.

Here, in the third case, it is determined that a normal-communication location registration process for the mobile terminal UE needs to be performed before an emergency-communication location registration process for the mobile terminal UE is performed in the IP network.

In step S3006, the mobile terminal UE transmits, to the P-CSCF, a normal registration request for requesting that the S-CSCF#1 perform the normal-communication location registration process (Normal Registration process) for the mobile terminal UE by using normal-communication user identifiers.

In step S3007, in response to the normal registration request, the normal-communication location registration process for the mobile terminal UE is performed between the mobile terminal UE and the S-CSCF#1 by referring to the HSS.

In step S3008, the mobile terminal UE determines whether an emergency-communication location registration process for the mobile terminal UE needs to be performed in the S-CSCF#2, based on information (determination key, for example) notified from the IP network in the normal-communication location registration process for the mobile terminal UE performed in step S3007. That is, the mobile terminal UE determines whether both of the normal-communication location registration process and the emergency-communication location registration process for the mobile terminal UE need to be performed, in performing emergency-communications in the IP network.

Here, in the third case, assume that it is determined that not both of the normal-communication location registration process and the emergency-communication location registration process for the mobile terminal UE need to be performed, in performing the emergency-communications.

In step S3009, the mobile terminal UE transmits, to the P-CSCF, an Emergency-communication session establishment process request for requesting that an emergency-communication session establishment process be performed between the mobile terminal UE and the PSAP by using normal-communication user identifiers without performing an emergency-communication location registration process for the mobile terminal UE in the S-CSCF#2.

In step S3010, the P-CSCF forwards the received Emergency-communication session establishment process request to the E-CSCF.

In step S3011, the E-CSCF forwards the received Emergency-communication session establishment process request to the PSAP.

In step S3012, an emergency-communication location registration process for the mobile terminal UE is not performed in the S-CSCF#2. Nonetheless, an emergency-communication session establishment process between the mobile terminal UE and the PSAP is performed, since in the above-described IP network, the normal-communication location registration process for the mobile terminal UE is completed in the S-CSCF#1.

By using the emergency-communication session establishment process set as described above, the mobile terminal UE can perform emergency-communications between the mobile terminal UE and the PSAP.

Fourthly, the operations of the mobile communication system according to a fourth case of the present embodiment will be described while referring to FIG. 10.

Figure 10:
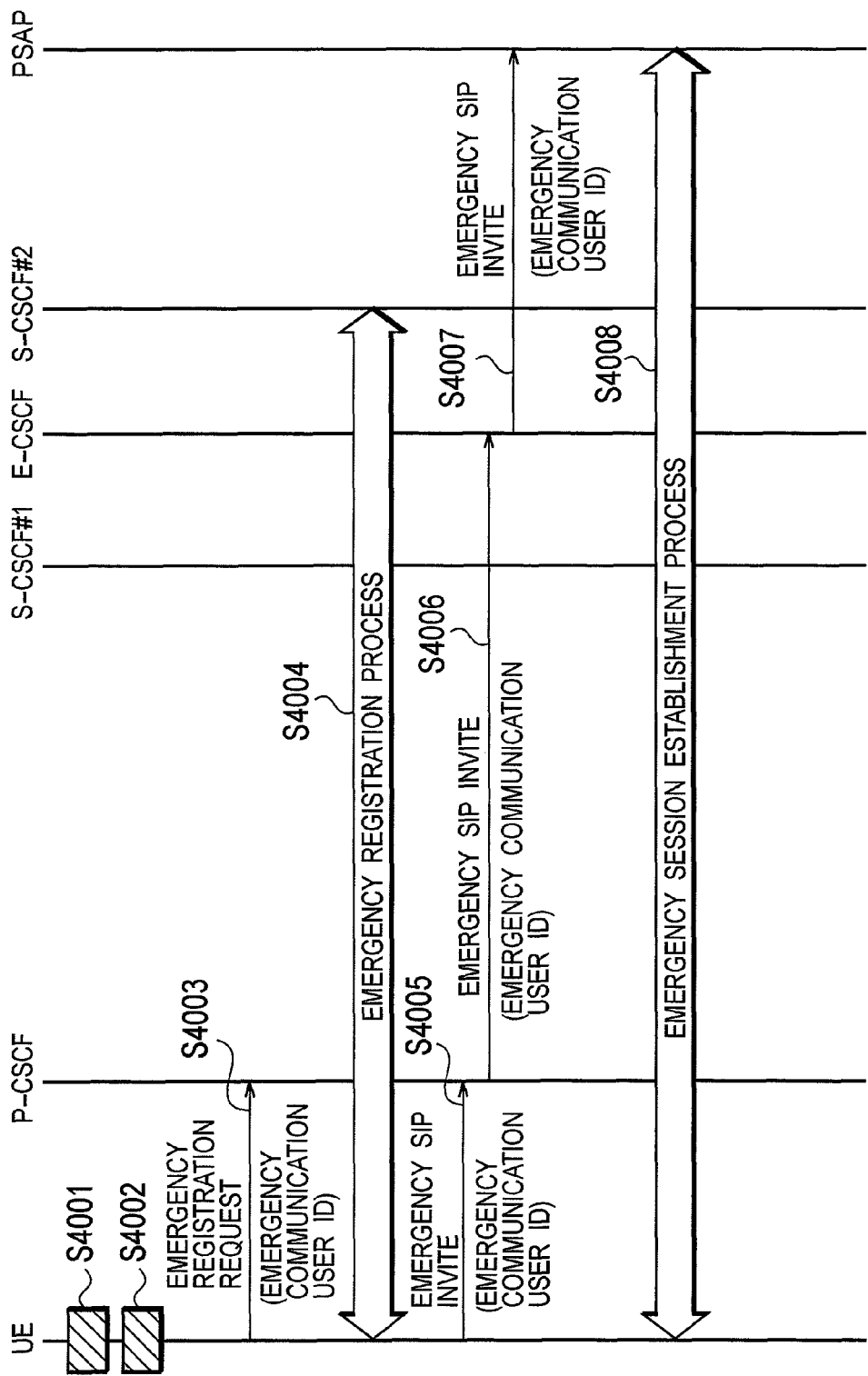
FIG. 10 is a sequential view for illustrating the operations of the mobile communication system according to the first embodiment of the present invention.

In the fourth case, as shown in FIG. 10, the mobile terminal UE determines: that a UICC is provided in the mobile terminal UE in step S4001; and that a normal-communication location registration process for the mobile terminal UE is not completed in the S-CSCF#1, in step S4002.

Alternatively, in step S4001 of the fourth case, the mobile terminal UE may determine that a UICC is not provided in the mobile terminal UE, as shown in FIG. 10.

In either case, in step S4003, the mobile terminal UE transmits, to the P-CSCF, an emergency registration request for requesting that the S-CSCF#2 perform an emergency-communication location registration process for the mobile terminal UE by using emergency-communication user identifiers.

In step S4004, in response to the emergency registration request, the P-CSCF determines that a normal-communication location registration process for the mobile terminal UE does not need to be performed before the emergency-communication location registration process for the mobile terminal UE is performed in the IP network. Then, the emergency-communication location registration process for the mobile terminal UE is performed between the mobile terminal UE and the S-CSCF#2 by referring to the HSS.

In step S4005, the mobile terminal UE transmits, to the P-CSCF, an emergency-communication session establishment process request (Emergency SIP Invite) for requesting that an emergency-communication session establishment process be performed between the mobile terminal UE and the PSAP by using emergency-communication user identifiers after the above-described emergency-communication location registration process is completed.

In step S4006, the P-CSCF forwards the received Emergency SIP Invite to the E-CSCF.

In step S4007, the E-CSCF forwards the received emergency-communication session establishment process request to the PSAP.

In step S4008, in response to the Emergency SIP Invite, the emergency-communication session establishment process between the mobile terminal UE and the PSAP is performed between the mobile terminal UE and the PSAP by referring to the HSS, although a normal-communication location registration process for the mobile terminal UE is not performed in the S-CSCF#1.

By using the emergency-communication session establishment process set as described above, the mobile terminal UE can perform emergency-communications between the mobile terminal UE and the PSAP.

(Advantageous Effects of the Mobile Communication System According to the First Embodiment of the Present Invention)

In the mobile terminal and the mobile communication system according to the present embodiment, an emergency-communication session establishment process would be performed between the mobile terminal UE and the PSAP without performing an emergency-communication location registration process for the mobile terminal UE in the S-CSCF#2, when a normal-communication location registration process for the mobile terminal is completed in the S-CSCF#1 and it is determined that not both of the normal-communication location registration process and the emergency-communication location registration process for the mobile terminal UE need to be performed, in performing the emergency-communications in the IP network. Accordingly, time until starting emergency-communications in an IP network can be shortened.

In addition, in the mobile terminal and the mobile communication system according to the present embodiment, when it is determined that both of the normal-communication location registration process and the emergency-communication location registration process for the mobile terminal UE need to be performed in performing the emergency-communications in the IP network and when a normal-communication location registration process for the mobile terminal UE is completed in the S-CSCF#1, an emergency-communication session establishment process is performed between the mobile terminal UE and the PSAP after an emergency-communication location registration process for the mobile terminal UE is performed in the S-CSCF#2. Accordingly, the mobile terminal and the mobile communication system according to the present embodiment are applicable to a conventional IP network in which both of the normal-communication location registration process and the emergency-communication location registration process for the mobile terminal UE need to be performed, in performing emergency-communications. Also, the mobile terminal and the mobile communication system according to the present embodiment are applicable to the IP network according to the present invention in which not both of the normal-communication location registration process and the emergency-communication location registration process for the mobile terminal UE need to be performed in performing emergency-communications.

In addition, when a UICC is not provided in the mobile terminal UE, or when an emergency-communication location registration process for the mobile terminal UE is completed in the S-CSCF#2 in response to an emergency registration request transmitted by the mobile terminal UE and when a normal-communication location registration process for the mobile terminal UE is not completed in the S-CSCF#1, the mobile terminal and mobile communication system according to the present embodiment are configured that an emergency-communication session establishment process would be performed between the mobile terminal UE and the PSAP without performing a normal-communication location registration process for the mobile terminal UE in the S-CSCF#1. Accordingly, time until starting emergency-communications in the IP network can be shortened.

(A Mobile Communication System According to a Second Embodiment of the Present Invention)

Referring to FIGS. 11 to 16, a mobile communication system according to a second embodiment of the present invention will be described.

In the present embodiment, the above-described S-CSCF#1 (first call control apparatus) and the S-CSCF#2 (second call control apparatus) are provided in the same apparatus (S-CSCF).

Specifically, operations of the mobile terminal UE according to the present embodiment will be described by referring to FIGS. 11 and 12, and operations of the mobile communication system according to the present embodiment will be described by referring to FIGS. 13 to 16.

Figure 11:
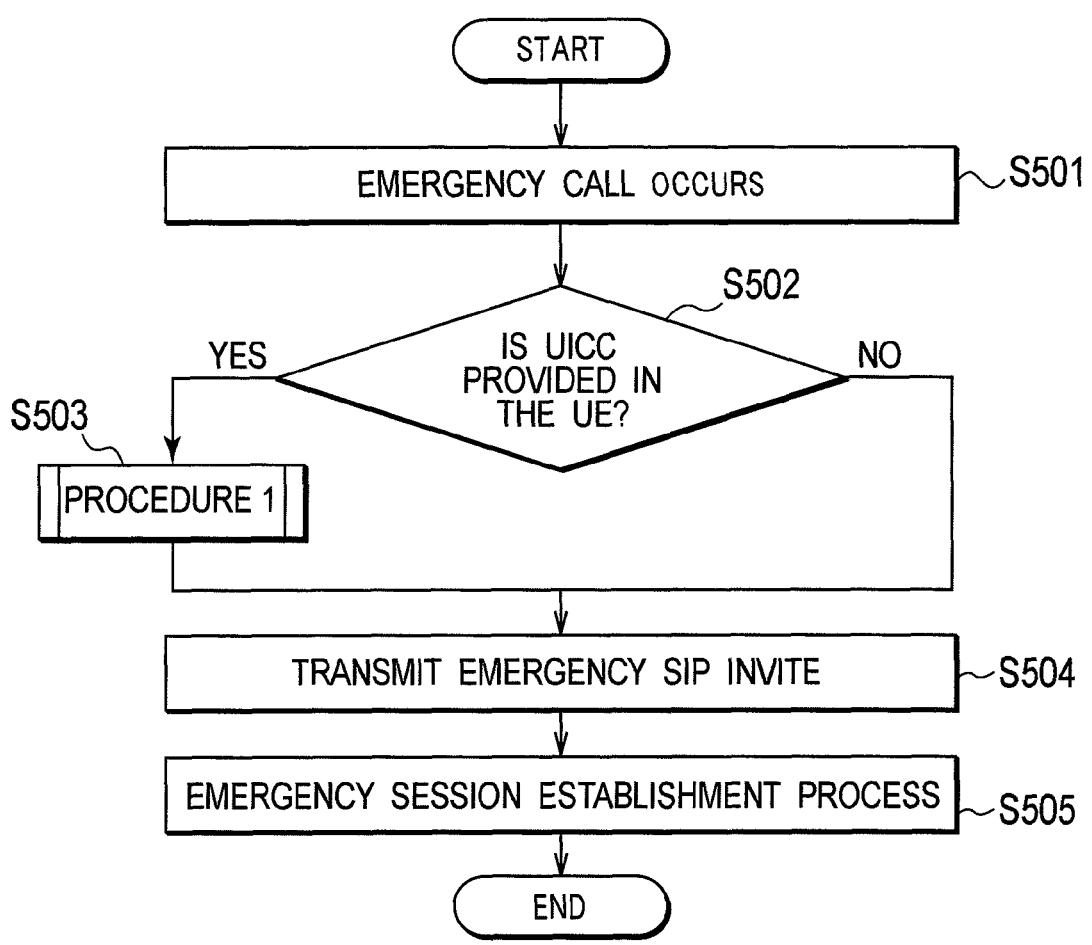
FIG. 11 is a flowchart showing the overall operations of the mobile communication system according to the first embodiment of the present invention.

As shown in FIG. 11, in step S501, an emergency call to be performed from the mobile terminal UE to the PSAP occurs.

In step S102, the mobile terminal UE determines whether a UICC is provided in the mobile terminal UE.

When it is determined that a UICC is provided in the mobile terminal UE, the present operation proceeds to step S503 to execute the procedure 1. When it is determined that a UICC is not provided in the mobile terminal UE, the present operation proceeds to step S504.

Here, by referring to FIG. 12, operations of the procedure 1 performed by the mobile terminal UE will be described.

Figure 12:
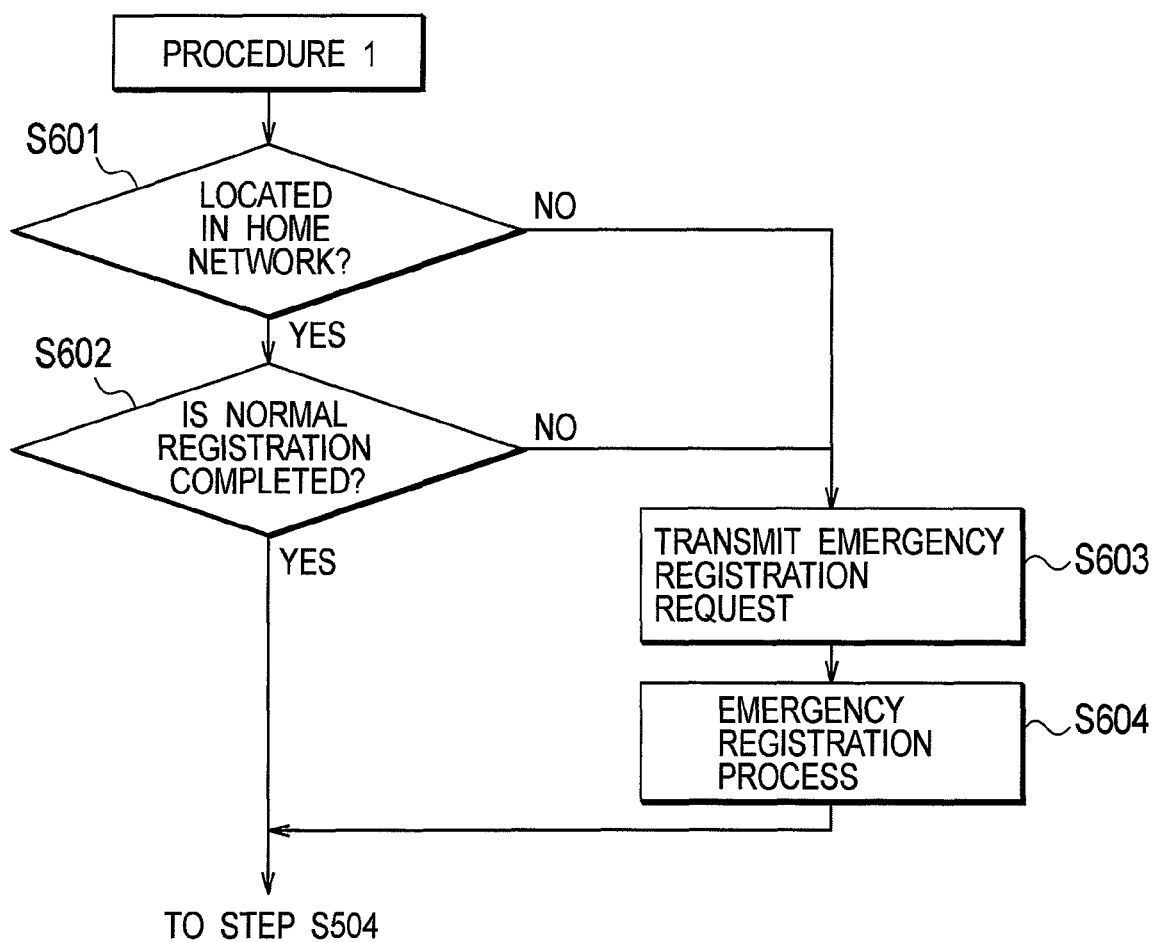
FIG. 12 is a flowchart at procedure 1 in the overall operations of the mobile communication system according to the first embodiment of the present invention.

As shown in FIG. 12, in step S601, the mobile terminal UE determines whether or not the mobile terminal UE is located in a Home network or in a visited network, by using information acquired from an IP network in performing, for example, a GPRS (General Packet Radio Service) attach process (registration process for GPRS) or I-WLAN attach process (registration process for I-WLAN), based on information notified from the IP network in performing a registration process in the IP network.

When it is determined that the mobile terminal UE is located in the Home network, the present operation proceeds to step S602. When it is determined that the mobile terminal UE is located in the visited network, the present operation proceeds to step S603.

In step S602, the mobile terminal UE determines whether a normal-communication location registration process for the mobile terminal UE is completed in the S-CSCF#1.

When it is determined that the normal-communication location registration process for the mobile terminal UE is completed, the present operation proceeds to step S504 in FIG. 11. When it is determined that the normal-communication location registration process for the mobile terminal UE is not completed, the present operation proceeds to step S603.

In step S603, the mobile terminal UE transmits, to the P-CSCF, an emergency registration request for requesting that an emergency-communication location registration process be performed by using emergency-communication user identifiers, in order to perform the emergency-communication location registration process.

In step S604, after the mobile terminal UE performs the emergency registration between the mobile terminal UE and the S-CSCF#2, the present operation proceeds to step S504 in FIG. 11.

Specifically, the mobile terminal UE determines whether an emergency-communication location registration process for the mobile terminal UE needs to be performed in the S-CSCF#2 based on information (determination key, for example) notified from the IP network in performing the registration process for the mobile terminal UE in the IP network. In other words, the mobile terminal UE determines whether both of the normal-communication location registration process and the emergency-communication location registration process for the mobile terminal UE need to be performed in performing the emergency-communications in the IP network.

Specifically, when it is determined that the mobile terminal UE is located in the Home network, based on the information (determination key, for example) notified from the IP network in the registration process for the mobile terminal UE in the IP network, the mobile terminal UE determines that not both of the normal-communication location registration process and the emergency-communication location registration process for the mobile terminal UE need to be performed in performing the emergency-communications in the IP network.

On the other hand, when it is determined that the mobile terminal UE is not located in the Home network (that is, located in the visited network), based on the information (for example, determination key) notified from the IP network in the registration process for the mobile terminal UE in the IP network, the mobile terminal UE determines that both of the normal-communication location registration process and the emergency-communication location registration process for the mobile terminal UE need to be performed in performing the emergency-communications in the IP network.

In step S504, the mobile terminal UE transmits, to the P-CSCF, an emergency-communication session establishment process request (Emergency SIP Invite) for requesting that an emergency-communication session establishment process be performed between the mobile terminal UE and the PSAP, in order to perform an emergency-communication session establishment process used for emergency-communications between the mobile terminal UE and the PSAP.

In step S505, the mobile terminal UE performs the emergency-communication session establishment process used for emergency-communications between the mobile terminal UE and the PSAP.

Next, operations (in four cases) to start emergency-communications between the mobile terminal UE and the PSAP in the mobile communication system according to the present embodiment will be described by referring to FIGS. 13 to 16.

Firstly, the operations of the mobile communication system according to a first case of the present embodiment will be described by referring to FIG. 13.

Figure 13:
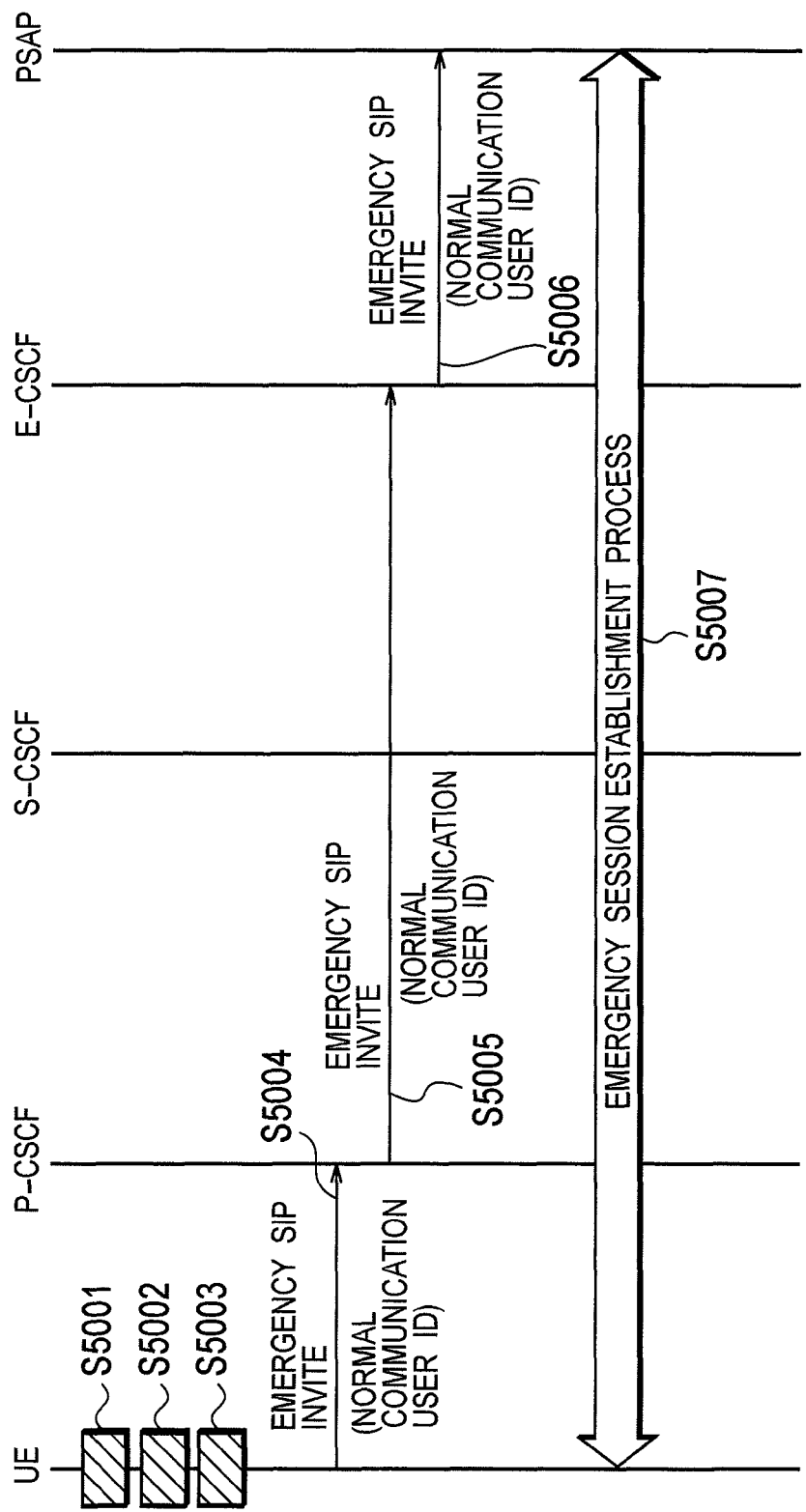
FIG. 13 is a sequential view for illustrating the operations of the mobile communication system according to the first embodiment of the present invention.

In the first case, as shown in FIG. 13, the mobile terminal UE determines: that a UICC is provided in the mobile terminal UE in step S5001; that the mobile terminal UE is located in the Home network in step S5002; and that a normal-communication location registration process for the mobile terminal UE is completed in step S5003.

In such case, in step S5004, the mobile terminal UE transmits, to the P-CSCF, an emergency-communication session establishment process request (Emergency SIP Invite) for requesting that an emergency-communication session establishment process (Emergency Session Establishment process) be performed between the mobile terminal UE and the PSAP by using normal-communication user identifiers without performing an emergency-communication location registration process for the mobile terminal UE in the S-CSCF#2.

In step S5005, the P-CSCF forwards the received Emergency-communication session establishment process request to the E-CSCF.

In step S5006, the E-CSCF forwards the received Emergency-communication session establishment process request to the PSAP.

In step S5007, an emergency-communication location registration process for the mobile terminal UE is not performed in the S-CSCF#2 in the above-described IP network. Nonetheless, an emergency-communication session establishment process between the mobile terminal UE and the PSAP is performed, since the normal-communication location registration process for the mobile terminal UE is completed in the S-CSCF#1.

By using the emergency-communication session establishment process set as described above, the mobile terminal UE can perform emergency-communications between the mobile terminal UE and the PSAP.

Secondly, the operations of the mobile communication system according to a second case of the present embodiment will be described by referring to FIG. 14.

Figure 14:
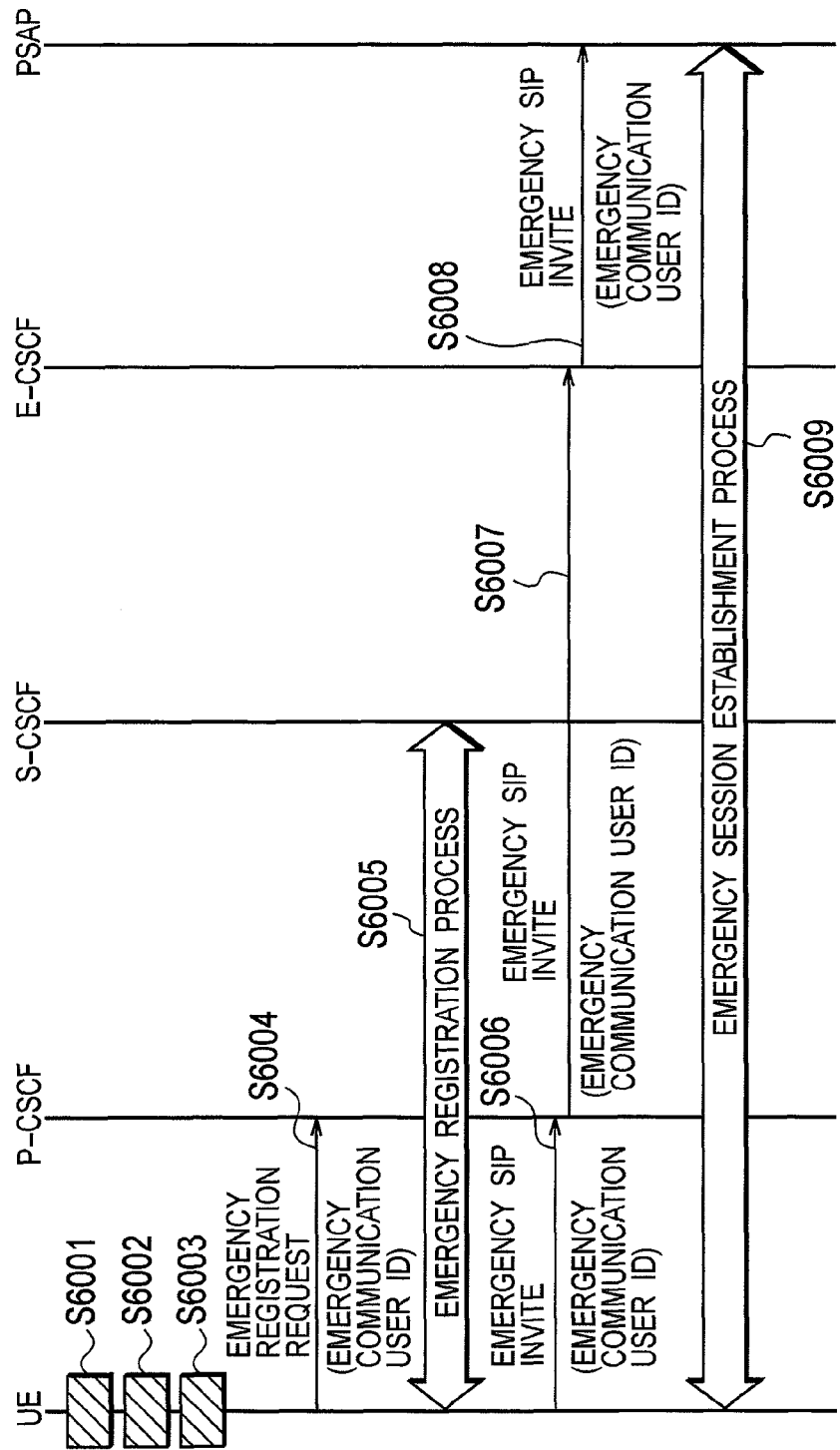
FIG. 14 is a sequential view for illustrating the operations of the mobile communication system according to the first embodiment of the present invention.

In the second case, as shown in FIG. 14, the mobile terminal UE determines: that a UICC is provided in the mobile terminal UE in step S6001; that the mobile terminal UE is located in the Home network in step S6002; and that a normal-communication location registration process for the mobile terminal UE is not completed in step S6003.

In step S6004, the mobile terminal UE transmits, to the P-CSCF, an emergency registration request for requesting that the S-CSCF#2 perform an emergency-communication location registration process for the mobile terminal UE by using emergency-communication user identifiers.

In step S6005, in response to the emergency registration request, the emergency-communication location registration process for the mobile terminal UE is performed between the mobile terminal UE and the S-CSCF#2 by referring to the HSS.

In step S6006, the mobile terminal UE transmits, to the P-CSCF, an emergency-communication session establishment process request (Emergency SIP Invite) for requesting that an emergency-communication session establishment process be performed between the mobile terminal UE and the PSAP by using emergency-communication user identifier, after the emergency-communication location registration process is completed.

In step S6007, the P-CSCF forwards the received Emergency SIP Invite to the E-CSCF.

In step S6008, the E-CSCF forwards the received Emergency-communication session establishment process request to the PSAP.

In step S6009, in response to the Emergency SIP Invite, an emergency-communication session establishment process between the mobile terminal UE and the PSAP is performed between the mobile terminal UE and the PSAP.

By using the emergency-communication session establishment process set as described above, the mobile terminal UE can perform emergency-communications between the mobile terminal UE and the PSAP.

Thirdly, the operations of the mobile communication system according to a third case of the present embodiment will be described by referring to FIG. 15.

Figure 15:
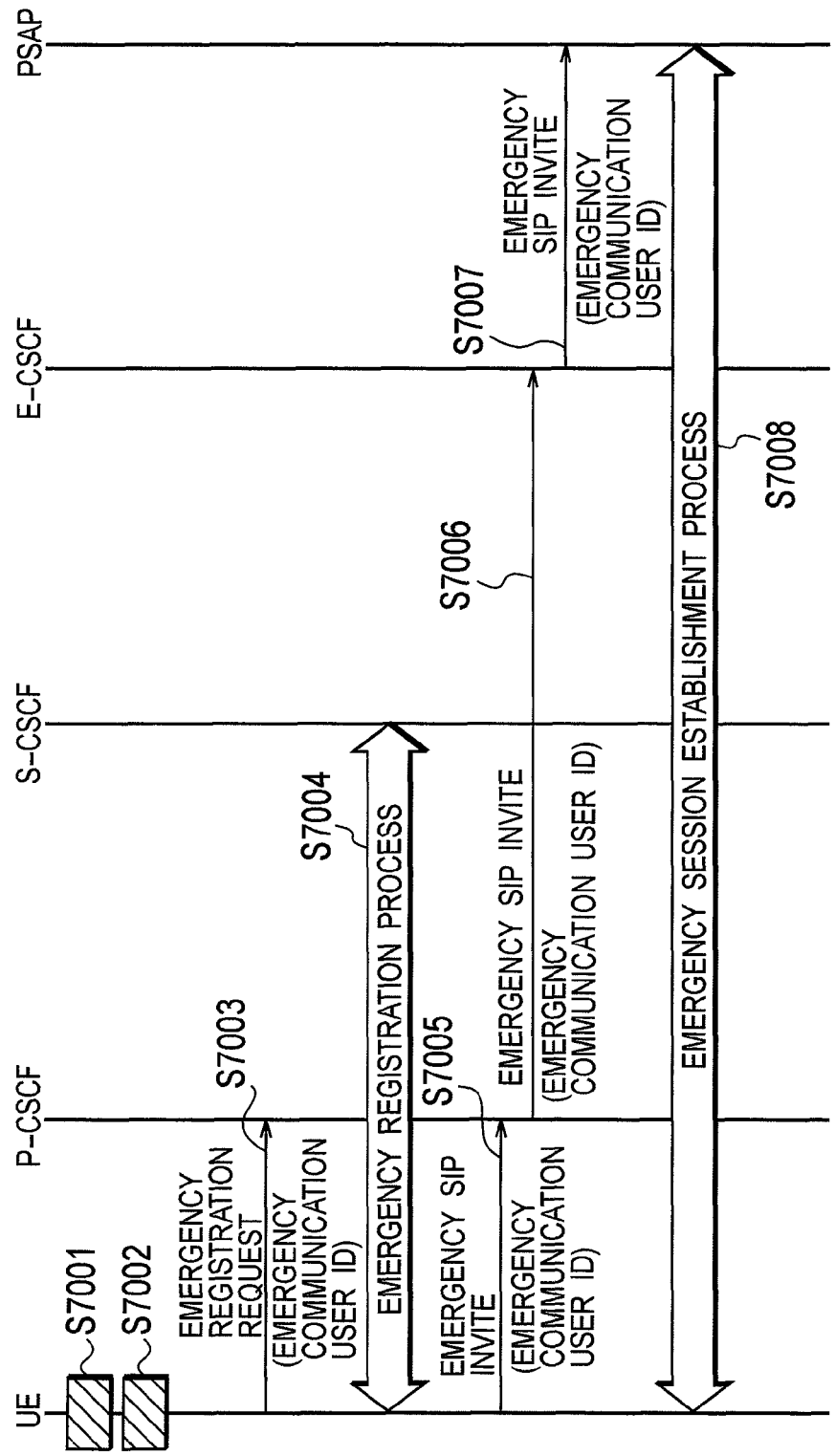
FIG. 15 is a sequential view for illustrating the operations of the mobile communication system according to the first embodiment of the present invention.

In the third case, as shown in FIG. 15, the mobile terminal UE determines: that a UICC is provided in the mobile terminal UE in step S7001; and that the mobile terminal UE is not located in the Home network in step S7002.

In step S7003, the mobile terminal UE transmits, to the P-CSCF, an emergency registration request for requesting that the S-CSCF#2 perform an emergency-communication location registration process for the mobile terminal UE by using emergency-communication user identifiers.

In step S7004, in response to the emergency registration request, an emergency-communication location registration process for the mobile terminal UE is performed between the mobile terminal UE and S-CSCF#2 by referring to the HSS.

In step S7005, the mobile terminal UE transmits, to the P-CSCF, an Emergency-communication session establishment process request for requesting that an emergency-communication session establishment process be performed between the mobile terminal UE and the PSAP by using a user normal-communication user identifier without performing an emergency-communication location registration process for the mobile terminal UE in the S-CSCF#2.

In step S7006, the P-CSCF forwards the received Emergency-communication session establishment process request to the E-CSCF.

In step S7007, the E-CSCF forwards the received Emergency-communication session establishment process request to the PSAP.

In step S7008, in the above-described IP network, an emergency-communication location registration process for the mobile terminal UE is not performed in the S-CSCF#2. Nonetheless, an emergency-communication session establishment process between the mobile terminal UE and the PSAP is performed, since the normal-communication location registration process for the mobile terminal UE is completed in the S-CSCF#1.

By using the emergency-communication session establishment process set as described above, the mobile terminal UE can perform emergency-communications between the mobile terminal UE and the PSAP.

Fourthly, the operations of the mobile communication system according to a fourth case of the present embodiment will be described by referring to FIG. 16.

In the fourth case, as shown in FIG. 16, the mobile terminal UE determines, in step S8001, that a UICC is not provided in the mobile terminal UE.

In step S8002, the mobile terminal UE transmits, to the P-CSCF, an emergency-communication session establishment process request (Emergency SIP Invite) for requesting that an emergency-communication session establishment process be performed between the mobile terminal UE and the PSAP by using emergency-communication user identifiers.

In step S8003, the P-CSCF forwards the received Emergency SIP Invite to the E-CSCF.

In step S8004, the E-CSCF forwards the received Emergency-communication session establishment process request to the PSAP.

In step S8005, a normal-communication location registration process for the mobile terminal UE is not performed in the S-CSCF#1. Nonetheless, an emergency-communication session establishment process between the mobile terminal UE and the PSAP is performed between the mobile terminal UE and the PSAP by referring to the HSS in response to the Emergency SIP Invite.

By using the emergency-communication session establishment process set as described above, the mobile terminal UE can perform emergency-communications.

As has been described above, the present invention has been described by using the above-described embodiments. However, it is obvious for those who are in the art that the present invention is not limited to the embodiments described herein. The present invention can be amended and be implemented as modified embodiments without departing from the contents and scope of the present invention, which are defined by the description of claims. Accordingly, the description of the present invention is intended to show an illustrative example, and not intended to limit the present invention.

INDUSTRIAL APPLICABILITY

As described above, the present invention can provide a mobile terminal and a mobile communication system, which can shorten a time until starting an emergency-communication in an IP network.

The invention claimed is:

1. A mobile terminal that performs a normal communication between the mobile terminal and a normal communication terminal via a first call control apparatus, and an emergency-communication between the mobile terminal and an emergency-communication terminal via a second call control apparatus, in an IP network including the first call control apparatus and the second call control apparatus, the mobile terminal comprising:
an emergency-communication session establishment processing unit configured to perform an emergency-communication session establishment process between the mobile terminal and the emergency-communication terminal, without performing an emergency-communication location registration process for the mobile terminal in the second call control apparatus, when a normal-communication location registration process for the mobile terminal is completed in the first call control apparatus, and
when it is determined that not both of the normal-communication for the mobile terminal and emergency-communication location registration process for the mobile terminal need to be performed in order to perform the emergency-communication in the IP network,
wherein the emergency-communication session establishment processing unit is configured to perform the determination based on information notified from the IP network in performing the normal-communication location registration process for the IP network.

2. The mobile terminal according to claim 1,
wherein the emergency-communication session establishment processing unit is configured to perform the emergency-communication session establishment process between the mobile terminal and the emergency-communication terminal, without performing the emergency-communication location registration process for the mobile terminal in the second call control apparatus, when the normal-communication location registration process for the mobile terminal is completed in the first call control apparatus, and when a determination is made that not both of the normal-communication location registration process for the mobile terminal and the emergency-communication location registration process for the mobile terminal need to be performed in performing the emergency communication in the IP network.

3. The mobile terminal according to claim 2,
wherein the emergency-communication session establishment processing unit is configured to make the determination based on information notified from the IP network in performing the normal-communication location registration process for the mobile terminal.

4. The mobile terminal according to claim 1, comprising:
an emergency-communication location registration processing unit configured to transmit an emergency-communication location registration request for requesting that the second call control apparatus perform the emergency-communication location registration process for the mobile terminal, when the normal-communication location registration process for the mobile terminal is not completed in the first call control apparatus,
wherein the emergency-communication session establishment processing unit is configured to perform the emergency-communication session establishment process between the mobile terminal and the emergency-communication terminal, without performing the normal-communication location registration process for the mobile terminal in the first call control apparatus, when the emergency-communication location registration process for the mobile terminal is completed in the second call control apparatus in response to the emergency-communication location registration request.

5. The mobile terminal according to claim 1, comprising:
an emergency-communication location registration processing unit configured to transmit an emergency-communication location registration request for requesting that the second call control apparatus perform the emergency-communication location registration process for the mobile terminal, when a UICC is not mounted on UICC is not provided in the mobile terminal,
wherein the emergency-communication session establishment processing unit is configured to perform, the emergency-communication session establishment process between the mobile terminal and the emergency-communication terminal without performing the normal-communication location registration process for the mobile terminal in the first call control apparatus, when the emergency-communication location registration process for the mobile terminal is completed in the second call control apparatus in response to the emergency-communication location registration request.

6. The mobile terminal according to claim 2,
wherein the emergency-communication session establishment processing unit is configured to make the determination based on information notified from the IP network in performing a location registration process in the IP network.

7. A mobile communication system in which a mobile terminal performs a normal communication between the mobile terminal and a normal communication terminal via a first call control apparatus, and performs an emergency-communication between the mobile terminal and an emergency-communication terminal via a second call control apparatus, the normal communication and the emergency-communication being performed via an IP network including the first call control apparatus and the second call control apparatus,
wherein the mobile terminal is configured to transmit an emergency-communication session establishment process request for requesting that an emergency-communication session establishment process be performed between the mobile terminal and the emergency-communication terminal, when a normal-communication location registration process for the mobile terminal is completed in the first call control apparatus, wherein the IP network is configured to perform the emergency-communication session establishment process between the mobile terminal and the emergency-communication terminal, wherein when the emergency-communication location registration process for the mobile terminal is not performed in the second call control apparatus and when the normal-communication location registration process for the mobile terminal is completed in the first call control apparatus, and when it is determined that not both of the normal-communication for the mobile terminal and emergency-communication location registration process for the mobile terminal need to be performed in order to perform the emergency-communication in the IP network, wherein the emergency-communication session establishment processing unit is configured to perform the determination based on information notified from the IP network in performing the normal-communication location registration process for the IP network.

* * * * *